United States Patent
Augustin

[19]

[11] Patent Number: 5,868,111
[45] Date of Patent: Feb. 9, 1999

[54] FUEL INJECTION CONTROL SYSTEM FOR A MULTI-CYLINDER INTERNAL COMBUSTION ENGINE

[75] Inventor: Ulrich Augustin, Kernen, Germany

[73] Assignee: Daimler-Benz A.G., Stuttgart, Germany

[21] Appl. No.: 25,226

[22] Filed: Feb. 18, 1998

[30] Foreign Application Priority Data

Feb. 20, 1997 [DE] Germany .................. 197 06 694.1

[51] Int. Cl.⁶ .................................................. F02M 7/00
[52] U.S. Cl. ................................. 123/198 D; 123/456
[58] Field of Search ................................. 123/456, 451, 123/467, 198 D, 198 DB, 198 F, 446

[56] References Cited

U.S. PATENT DOCUMENTS

| | | | |
|---|---|---|---|
| 5,042,445 | 8/1991 | Peters | 123/198 DB |
| 5,076,227 | 12/1991 | Krieger | 123/198 DB |
| 5,121,730 | 6/1992 | Ausman | 123/467 |
| 5,176,115 | 1/1993 | Campion | 123/446 |
| 5,186,138 | 2/1993 | Hashimoto | 123/198 DB |
| 5,245,970 | 9/1993 | Iwaszkiewicz | 123/446 |
| 5,509,391 | 4/1996 | Degroot | 123/467 |
| 5,577,479 | 11/1996 | Popp | 123/456 |
| 5,598,893 | 2/1997 | Pouinger | 123/198 D |

FOREIGN PATENT DOCUMENTS

| | | |
|---|---|---|
| 2 282 851 | 4/1995 | Germany . |
| 43 35 171 | 5/1995 | Germany . |
| 44 14 242 | 10/1995 | Germany . |

*Primary Examiner*—Carl S. Miller
*Attorney, Agent, or Firm*—Klaus J. Bach

[57] ABSTRACT

In a fuel injection control system for a multi-cylinder internal combustion engine including a high pressure fuel pump for supplying fuel under pressure to the fuel injection valves of the various cylinders through a distribution line including a fuel distribution element dividing the fuel supply to two groups of fuel injection valves, the fuel distribution element includes a piston disposed in a cylinder and adapted to interrupt fuel flow to any one of the two groups in which a leak occurs such that fuel supply to the other group of fuel injection valves can be maintained for an emergency operation of the engine. If small leaks are detected by the electronic engine operating control, the valves of one of the groups are momentarily deactivated to cause the distribution element to interrupt the fuel supply to the other group of fuel injection valves. If this action eliminates the leakage, the leakage is determined to be in the supply to the other group of fuel injection valves and the fuel supply to the other group of fuel injection valves remains interrupted while the fuel injection valves of the one group are reactivated to permit operation of the engine on an emergency basis.

6 Claims, 2 Drawing Sheets

FUEL INJECTION CONTROL SYSTEM FOR A MULTI-CYLINDER INTERNAL COMBUSTION ENGINE

BACKGROUND OF THE INVENTION

The invention resides in a fuel injection control system for a multi-cylinder internal combustion engine especially a Diesel engine, including a high-pressure fuel pump supplying fuel, by way of a distribution element and distribution lines, to the fuel injectors of the various cylinders.

Such a fuel injection control system is known, for example, in D 43 35 171 C1. The fuel injection system disclosed therein permits the recognition of leakage in the system and includes means for shutting down the leaking system line. However, the system recognizes only relatively large leakages and, consequently, is effective only when relatively large leakages occur.

It is the object of the present invention to provide a fuel injection control system, which, with improved accuracy can also recognize relatively small leakages and is adapted to provide counter measures in a simple manner.

SUMMARY OF THE INVENTION

In a fuel injection control system for a multi-cylinder internal combustion engine including a high pressure fuel pump for supplying fuel under pressure to the fuel injection valves of the various cylinders through a distribution line including a fuel distribution element dividing the fuel supply to two groups of fuel injection valves, the fuel distribution element includes a piston disposed in a cylinder and adapted to interrupt fuel flow to any one of the two groups in which a leak occurs such that fuel supply to the other group of fuel injection valves can be maintained for an emergency operation of the engine. If a small leak is detected by the electronic engine operating control, the valves of one of the group are momentarily deactivated to cause the distribution element to interrupt the fuel supply to the other group of fuel injection valves. If this action eliminates the leakage, the leakage is determined to be in the supply to the other group of fuel injection valves and the fuel supply to the other group of fuel injection valves remains interrupted while the fuel injection valves of the one group are reactivated to permit operation of the engine on an emergency basis.

For the present invention, it is taken for granted that the electronic engine control system can recognize the existence of a small leakage in the fuel injection system, but cannot recognize the location and the extent of such a leakage.

A line with a relatively large leakage is automatically shut off by the pressure piston in the distribution element. The automatic shut off is caused by a pressure loss in the distribution line whereby the pressure piston is moved out of its center position into a position in which the line with the leakage is closed.

It is noted that small leakages are recognized by the electronic control system of the internal combustion engine. "Small leakages" are leakages which do not cause a large pressure loss which would cause the pressure piston to block the respective distribution line. However, when a leakage is recognized by the electronic control system, a signal is provided by the electronic control system to the fuel injection system whereby, on the basis of suspicion, the injection valves of one group, that is at one side of the distribution element, are kept closed so that, with the next injection cycle, only the injection valves of the other group at the other side of the distribution element are activated. With the one-sided activation of the injection valves and the resulting pressure imbalance at the pressure piston, the pressure piston causes the closing of the distribution line during the next stroke of the high pressure pump at the one side where the injection valves had before been activated. If the electronic control system then determines that the leakage has been eliminated, the suspicion of leakage at the one side was correct and the respective distribution line can be maintained closed. With a reduced fuel pump volume, the engine can continue to operate on an emergency basis with only the cylinders of that side of the engine activated wherein there is no leak.

However, if the electronic control system determines that the leakage is still present, the pumping volume of the high pressure pump is reduced for at least one cycle and the originally deactivated injection valves are reactivated so that they inject fuel into the respective cylinders. This provides for a pressure reduction in the respective cylinder space of the distribution element whereby the pressure piston returns to its center position, thereby opening again the previously blocked other side so that fuel is supplied again to both sides. By an appropriate control signal, the testing procedure is then reversed, that is, the valves activated first on the basis of suspicion are deactivated. In this way, the side, in which the leakage ought to be, is placed out of order and an emergency operation of the engine with the properly operating side of injection valves and the respective cylinders is possible.

Advantageous embodiments of the invention will be described below on the basis of the accompanying drawings.

DESCRIPTION OF A PREFERRED EMBODIMENT

Figure 1:
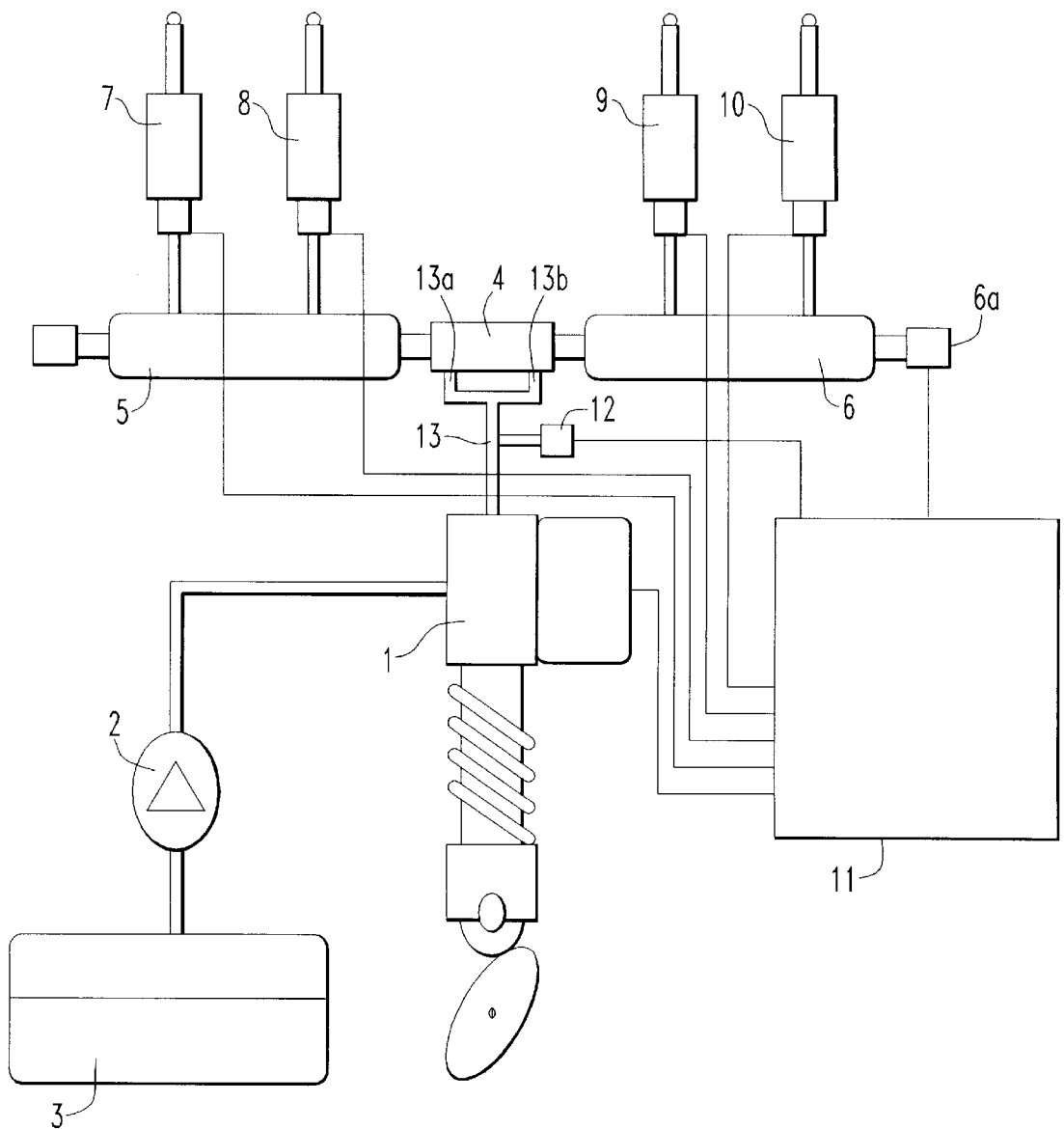
FIG. 1 shows schematically the fuel injection system according to the invention.

Fuel injection systems of the type with which the invention is concerned are known in the art so that it is not necessary to describe such a system in detail. The following description is therefore mainly directed to the features essential for an explanation of the invention.

Fuel is supplied from a fuel tank 3 to a high pressure pump 1 by a supply pump 2. The high pressure pump 1 supplies fuel under pressure to a distribution element 4 from where it is supplied to two rail sides with distribution conduits 5 and 6. The distribution conduit 5 is in communication with the injection valves 7 and 8 and the distribution conduit 6 is in communication with the injection valves 9 and 10.

An electronic control unit 11 controls the high pressure pump 1 and the injection valves 7 to 10. The high pressure pump is connected to the distribution element 4 by a high pressure line 13. A pressure sensor 12 is connected to the high pressure line 13 for sensing the pressure therein and supplying a pressure signal to the control unit 11. The high pressure line 13 is divided into two fuel divider lines 13*a*, 13*b*, which are connected to opposite ends of the distribution element 4. The system includes additional pressure sensors, for example in the distribution conduits 5 and 6, of which only the pressure sensor 6*a* is shown and which are also connected to the electronic control unit 11 to provide pressure signals thereto.

Figure 2:
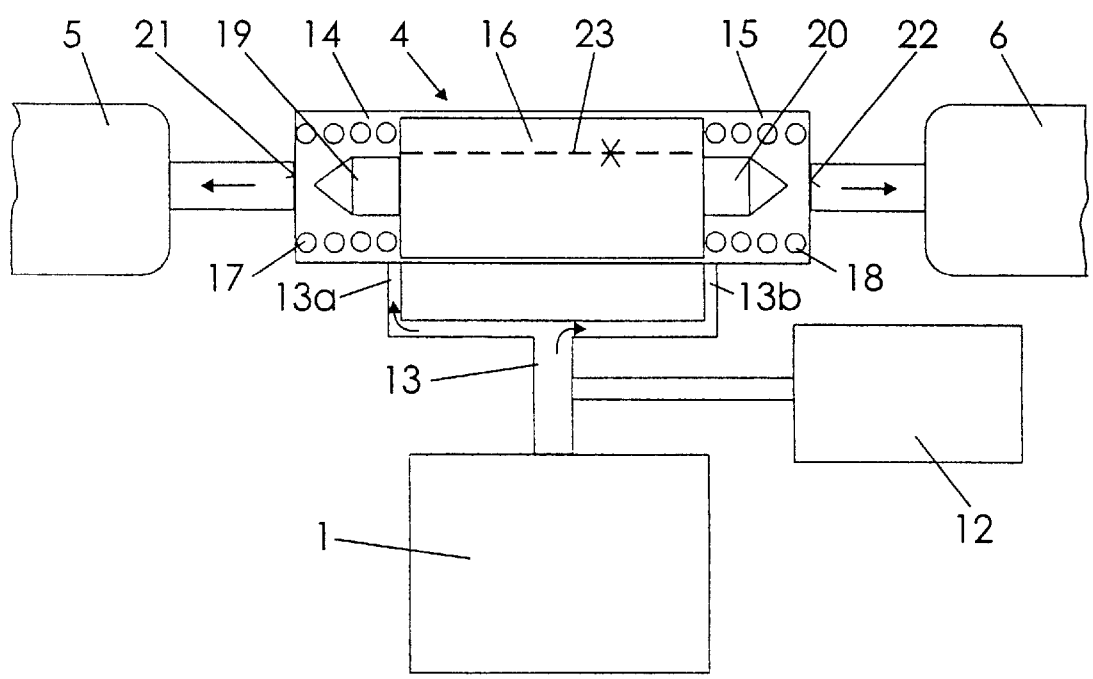
FIG. 2 is an enlarged schematic representation of the distribution element including a pressure piston for controlling the fuel supply from the high pressure pump to the distribution lines.

The design and operation of the distribution element is apparent from FIG. 2. The high pressure pump 1 supplies high pressure fuel by way of the dividing lines 13a and 13b to the cylinder chamber 14 and 15, which are disposed at opposite sides of a pressure piston 16 movably disposed in the distribution element 4. The two cylinder chambers 14 and 1 at opposite sides of the piston 16 include springs 17 and 18 which are engaging each an end wall of the distribution element 4 and the adjacent face of the pressure piston 16. The two springs 17 and 18 hold the pressure piston 16 in a center position in the distribution element 4 during normal engine operation.

At its opposite ends, the pressure piston 16 is provided with closing members 19 and 20 in the form of closing rods which project into the cylinder chambers 14 and 15, respectively. With the closing member 19, an outlet opening 21 to the distribution conduit 5 and with the closing member 20, an outlet opening 22 to the distribution conduit 6 can be closed.

The operation of the fuel injection system according to the invention is as follows:

During normal engine operation, the high pressure pump 1 supplies fuel to the cylinder chambers 14 and 15 of the distribution element 4 by way of the dividing lines 13a and 13b. During a discharge stroke of the high pressure pump 1, the pressure piston 16 remains in its center position as the pressure at its opposite ends is the same. During the intake stroke of the high pressure pump 1 when it does not pump any fuel, the same amount of fuel is discharged subsequently from both rail sides by the activation of the respective fuel injection valves 7–10. At this time, the piston 16 moves slightly out of its center position, but does not reach its end position in which it would close one of the openings 21 or 22. After fuel injection, it is returned to its center position where it is held by the springs 17 and 18.

If now defect, that is a large leakage occurs for example in the rail of the distribution conduit 5, the pressure piston 16 with the closing member 19 is moved, because of the pressure drop in the cylinder chamber 14, toward the outlet opening 21 which is then closed by the closing member 19. With the other rail of the distribution conduit 6, which remains operative, emergency operation of the engine can be maintained if the electronic control unit 11 causes a reduction of the pump volume by means of the pressure regulator.

If a small leakage occurs in the fuel injection system, which is recognized by the engine control system, but which is too small to cause the initiation of the automatic closure by the pressure piston 16 described above, the electronic control system 11 initiates the following procedure:

The injection valves on one rail side, for example, the injection valves 7 and 8 are deactivated that is, they are kept closed. The injection valves 9 and 10 on the other rail side are so controlled that the full fuel amount is injected. Subsequently, the high pressure pump 1 pumps at least one more time with a normal stroke or a stroke adapted to the previous fuel injection volume whereby, because of the deactivated injecting valves 7 and 8 and the earlier pressure loss in the distribution conduit 6, the pressure piston 16 moves toward the outlet opening 22 such that the outlet opening 22 is closed by the closing member 20.

If the electronic control system 11 then determines in a subsequent check that the leakage has now been eliminated then the blocked rail side with the distribution conduit 6 is the side which includes the leak. By adapting the fuel pump volume and reactivation of the earlier deactivated valves 7 and 8, an emergency operation of the engine with a reduced amount of cylinders can be maintained.

If during the check the electronic control system finds that the leakage is still present. The pumping volume of the high pressure pump 1 is reduced for at least one cycle. The originally deactivated valves 7 and 8 are activated. As a result, the pressure in the cylinder chamber 14 drops and, when the pressure in the two cylinder chambers 14 and 15 is equalized, the pressure piston 16 returns automatically to its center position so that the outlet opening 22 is again opened. Then the deactivation strategy is repeated in an inverse sense. Now the injection valves 7 and 8 with their distribution conduit 5 remain activated and the injection valves 9 and 10 with their distribution conduit 6 are deactivated that is closed. With the activation of the injection valves 7 and 8, the pressure on this rail side drops, the pressure piston 16 moves from its center position and closes with its closing member 19, the outlet opening 21 to the distribution conduit 5. As a result, the rail side with the distribution conduit 5 in which the leakage exists is isolated. By a subsequent renewed activation of injection valves 9 and 10 with a correspondingly reduced fuel pump volume, the engine can be operated on an emergency basis with the cylinders served by the injection valves 9 and 10.

With the arrangement of the pressure sensor 12 in the high pressure line 13 between the high pressure pump 1 and the distribution element 4, the sensor 12 senses the pressure in the operative rail side so that it can be continuously used for the surveillance of the control system.

In order to make it possible to equalize the pressure in the two cylinder chambers 14 and 15 and to facilitate the movement of the piston 16 to its center position, a throttle passage 23 may be provided which places the cylinder chambers 14 and 15 in communication with each other (shown in FIG. 2 by a dashed line). Such a throttle passage may simply be a bore extending axially through the pressure piston 16.

What is claimed is:

1. A fuel injection control system for a multi-cylinder internal combustion engine, particularly a Diesel engine, including a fuel injection valve for each cylinder, a high pressure fuel pump for providing fuel under pressure to said fuel injection valves, said fuel injection valves being divided into two groups having separate fuel distribution conduits, a fuel distribution element arranged in communication with said high pressure fuel pump to receive fuel under pressure therefrom and with said separate fuel distribution conduits for supplying said fuel under pressure to said two groups of fuel injection valves, said distribution element comprising a cylinder having a piston movably disposed therein so as to form cylinder chambers at opposite ends thereof, each of said cylinder chambers being in communication with said high pressure fuel pump, one of said cylinder chambers having an outlet connected to one of said fuel distribution conduits and the other having an outlet connected to the other of said fuel conduits, said cylinder including means for normally retaining said piston essentially in a center position within said cylinder permitting flow of high pressure fuel to both said distribution conduits through said cylinder chambers, said piston including means for blocking the fuel flow through either of said cylinder chambers upon movement of said piston out of its center position so that, upon occurrence of a leakage in the fuel supply connected to one of said cylinder chambers resulting in a pressure loss sufficient to move said piston out of its center position, fuel flow through said one chamber is automatically interrupted, and wherein, upon occurrence of a leakage which is too small to cause automatic interruption of the fuel supply to the respective group of fuel injection valves but is recognized by an electronic engine control system, the injection valves of one of said groups are deactivated while the pump volume of said high pressure pump is maintained for at least one more operating cycle so as to cause a pressure increase in the fuel distribution conduit and the cylinder chamber serving the injection valves in said one group thereby causing the piston to move out of its center position so as to interrupt fuel flow to the other group of fuel injection valves and, if then the leakage is found to be eliminated, the injection valves of said one group are reactivated while fuel flow to the other group of fuel injection valves remains interrupted and, if the leakage is found to be still present, the injection valves of said one group are again activated and the fuel injection valves of said other group are momentarily deactivated to cause the pressure piston to interrupt the fuel flow to the one group of fuel injection, whereupon the fuel injection valves of said other group are reactivated and the fuel flow to said one group of fuel injection valves remains interrupted.

2. A fuel injection control system according to claim 1, wherein said means for normally retaining said piston essentially in a center position in said distribution element comprises springs.

3. A fuel injection control system according to claim 2, wherein a spring is disposed in each of said cylinder chambers at opposite side of said pressure piston between a front side of said pressure piston and an adjacent end wall of said distribution element.

4. A fuel injection control system according to claim 1, wherein, during operation with the fuel to one of said groups of fuel injection valves interrupted, said high pressure fuel pump is operated in an emergency operation with about half of its pumping volume.

5. A fuel injection control system according to claim 1, wherein a pressure sensor is disposed in the high pressure line between said high pressure fuel pump and said fuel distribution element.

6. A fuel injection control system according to claim 1, wherein said cylinder chambers of opposite sides of said pressure piston are in communication with each other by a throttle passage.

* * * * *